United States Patent [19]

Kuhn

[11] Patent Number: 4,715,224

[45] Date of Patent: Dec. 29, 1987

[54] METHOD AND APPARATUS FOR MEASURING THE MASS OF A FLOWING MEDIUM

[75] Inventor: Ulrich Kuhn, Renningen, Fed. Rep. of Germany

[73] Assignee: Robert Bosch GmbH, Stuttgart, Fed. Rep. of Germany

[21] Appl. No.: 822,519

[22] Filed: Jan. 27, 1986

[30] Foreign Application Priority Data

Feb. 7, 1985 [DE] Fed. Rep. of Germany ....... 3504082

[51] Int. Cl.$^4$ .............................................. G01F 1/68
[52] U.S. Cl. ...................................................... 73/204
[58] Field of Search ...................... 73/204; 338/25, 28, 338/308

[56] References Cited

U.S. PATENT DOCUMENTS

| | | | |
|---|---|---|---|
| 3,592,055 | 7/1971 | Dorman | 73/204 |
| 3,900,819 | 8/1975 | Djorup | 73/204 |
| 4,024,761 | 5/1977 | Djorup | 73/204 |
| 4,214,478 | 7/1980 | Lauterbach | 73/204 |
| 4,354,829 | 11/1983 | Sumal | 73/204 |
| 4,468,963 | 9/1984 | Schauble | 73/204 |
| 4,549,433 | 10/1985 | Gneiss et al. | |

Primary Examiner—Herbert Goldstein
Attorney, Agent, or Firm—Edwin E. Greigg

[57] ABSTRACT

A device which serves to measure the mass of a flowing medium, in particular the mass of the air aspirated by an internal combustion engine. The device includes a substrate on the bottom and top of which there is disposed a respective temperature-dependent resistor electrically connected in parallel and preferably embodied as a film, on both sides of which at peripheral areas low-impedance electrical conductor tracks are provided. The peripheral areas of the substrate are partially encompassed by U-shaped deformations provided on metallic retainers. The retainers simultaneously serve as electrical connections via soldered areas provided between the U-shaped deformations and the conductor tracks. The retainers protrude into the flow of the medium and have good thermal conductivity, so that they are virtually at the temperature of the flowing medium, and hence the temperature of the peripheral areas is also kept at the temperature of the flowing medium. To reinforce this effect, additional thermal conduction surfaces on the retainers or further thermal conduction elements which have good thermal conductivity, can be provided. With the temperatures of the peripheral areas kept to the temperature of the flow of the medium, short startup and response times are provided by the device even when there are sudden major changes in the mass of the flowing medium.

7 Claims, 4 Drawing Figures

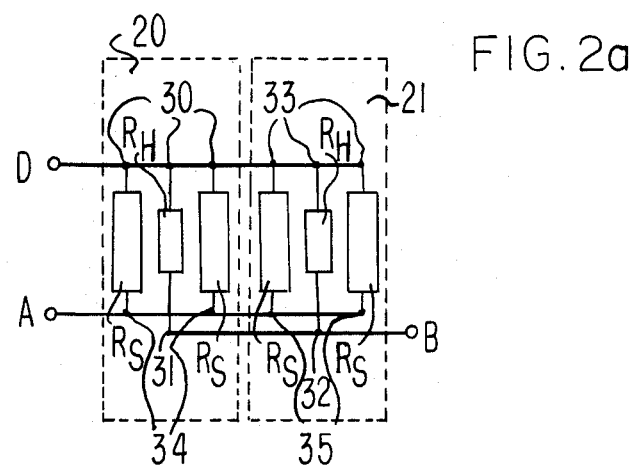

4,715,224

METHOD AND APPARATUS FOR MEASURING THE MASS OF A FLOWING MEDIUM

BACKGROUND OF THE INVENTION

The invention is directed to an improved method and apparatus for measuring the air intake mass to an internal combustion engine.

Experience with devices and methods of this type has shown that when used in motor vehicle for measuring the mass, or flow rate, of the air aspirated by the engine, an undesirably long period of time elapses between when the device is turned on and the time that it functions at an accuracy of, for instance, 10% with an idling aspirated air quantity of approximately 10 kg/h. The delay is partly due to the necessity for the temperature-dependent resistor to heat up to the specified resistance temperature. If there is a sudden change in the mass of aspirated air in the engine, such as when changing from the idling range of approximately 10 kg/h to the full load range of about 300 kg/h, or from full load at about 300 kg/h to idling at about 10 kg/h, then there is a delay, known as response time, before the desired accuracy is attained, that is, the device reacts to abrupt changes in the aspirated air mass only in a delayed manner.

These undesirably long startup or response times when the aspirated air mass is varying mean that if the output signal of the device is used for triggering a fuel injection system, the injected fuel quantity will not match the aspirated air quantity until after delay. Not only does this increase the fuel consumption, but it also means a higher proportion of toxic ingredients in the exhaust gas. Tests have shown that the unfavorable behavior of the device when it is turned on and when there are sudden relatively large changes in the aspirated air quantity is due to the fact that while the coarse adjustment of the temperature profile effected along the length of the substrate of the device as a result of the regulated supply of energy does happen very quickly, nevertheless, in order to effect an exact adjustment of a new temperature profile in the unheated peripheral area of the substrate, a specific quantity of heat is needed; this heat is taken from the heated portion of the substrate, in the form of a small flow of heat which is therefore of correspondingly long duration. Although the resistance temperature of the temperature-dependent resistor is regulated to a constant value regardless of the air mass or flow rate, still the temperature of the peripheral area does vary in accordance with the flow rate of the aspirated air; as a result, the temperature profile along the length of the substrate varies as the aspirated air flow rate varies. The flow of heat to the peripheral areas of the substrate becomes particularly important in percentage terms with small aspirated air masses, that is when there is little cooling capacity and hence a low electrical heating output with the result being an incorrect measurement.

OBJECT AND SUMMARY OF THE INVENTION

The method and apparatus according to the invention produce the principal object and have the advantage over the prior art that by keeping the peripheral areas of the substrate firmly at a predetermined peripheral temperature, the temperature profile along the length of the substrate is very highly pronounced and is virtually unvaried over time, so that if there are sudden relatively large changes in the mass of the flowing medium, there are virtually no changes in the temperature profile, and hence in the startup and shutoff times.

Another object which is particularly advantageous is that the peripheral temperature of the peripheral areas of the substrate are thermally coupled to the temperature of the flowing medium, or to the air temperature in particular, when the device is used as a flow rate meter for the air aspirated by internal combustion engines; this occasions only very slight expense and simultaneously has the advantage that the electrical contact with the resistor films applied to the substrate, which as a rule is effected in the peripheral areas of the substrate, can be effected by soft soldering, since when the device is in use the peripheral areas are always kept at the relatively low air temperature.

It is yet another object and extremely advantageous to put the peripheral areas of the substrate into thermal contact with metal thermal conductor elements disposed in the flow of the medium, which are made of some material having good thermal conduction properties and low mass. A further advantage is attained if the retainers attached to the housing, which can also serve as electrical connections, are embodied as thermal conductor elements.

Still another object provides particularly short startup and response times which are advantageously attained in another embodiment of the device according to the invention via a protective resistor, embodied as a film, disposed on each side of the temperature-dependent resistor along the length of the substrate, which is maintained approximately at a temperature which coincides with the resistance temperature of the temperature-dependent resistor.

The invention will be better understood and further objects and advantages thereof will become more apparent from the ensuing detailed description of preferred embodiments taken in conjunction with the drawings.

BRIEF DESCRIPTION OF THE DRAWINGS

FIG. 2a is a schematic view of the device according to the invention to illustrate the flow path therethrough.

DESCRIPTION OF THE PREFERRED EMBODIMENTS

Figure 1:
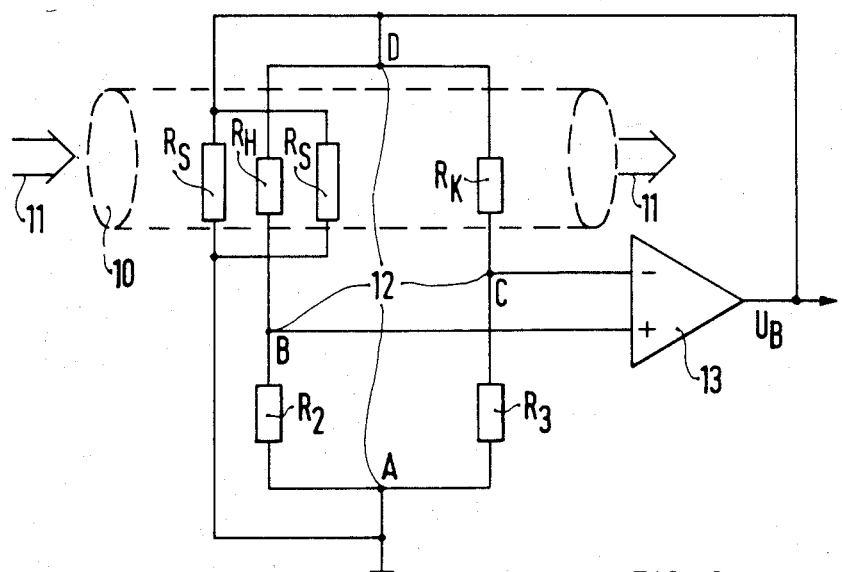
FIG. 1 is a circuit diagram of the device according to the invention.

In FIG. 1, a tube 10 is shown through which a medium flows, for example the intake of an internal combustion engine; the flow direction is indicated by arrows 11. For the purpose of explaining the mode of operation of the device according to the invention, however, it is generally unimportant how the flow direction is defined. A temperature-dependent resistor $R_H$ is introduced into the flowing medium; it preferably has a positive temperature coefficient and serves to detect the mass or flow rate of the medium flowing through the tube 10. The resistor $R_H$ is embodied as a film resistor on a substrate (not shown in FIG. 1), in particular an electrically insulating substrate, and forms a component of a resistance detecting device 12 which in the present example is embodied as a bridge circuit. This resistance detector 12 also includes further resistors $R_K$, $R_2$ and $R_3$. Beginning at the base point A of this resistance measuring bridge, the pairs of resistors $R_2$, $R_H$ and $R_3$, $R_K$ are each connected in series, one pair in each bridge branch, and the connecting lines of the resistors $R_H$ and $R_K$ are joined at point D. A regulating amplifier 13 is supplied with the signals from point B, as the junction of the resistors $R_2$ and $R_H$, as well as with the signals from point C, as the junction of the resistors $R_3$ and $R_K$. In the preferred exemplary embodiment shown in FIG. 1, the regulating amplifier 13 is embodied as a differential amplifier, but the invention is not limited to differential amplifiers of this kind; instead, it is applicable generally to any analog or digital regulating function.

The output variable of the regulating function is fed back to point D of the resistance detector, so that a closed loop is formed. The resistance values of the resistors of the resistance detector 12 are generally selected such that the resistors $R_K$, $R_3$ assume substantially higher values than the resistors $R_H$, $R_2$.

The resistance detector 12 can be realized not only in the form of a bridge circuit, but in the form of other resistance measuring circuits as well. Therefore, the invention is not limited to bridge circuits, but relates to other circuits as well, in particular measuring circuits similar to bridge circuits, such as those disclosed in U.S. Pat. No. 4,297,881, for example.

The mode of operation of this device is basically as follows:

The output current of the regulating amplifier 13 causes heating of the temperature-dependent resistor $R_H$, the resistance temperature of this resistor being substantially defined by conditions in the bridge resistors. Via the closed loop, the amount of heat flowing out of the temperature-dependent resistor $R_H$ is always compensated for by a variation in the incoming current, so that the resistor $R_H$ is kept at a specific resistance temperature or a specific resistance value. The heating current, the heating capacity or the output voltage of the regulating amplifier 13 represent standards for the flow rate of the flowing medium.

Since a fluctuating temperature of the flowing medium during a measurement also affects the resistance temperature or value of the temperature-dependent resistor $R_H$, the resistor $R_K$ is also exposed to the flowing medium, so that this effect of the temperature fluctuations of the medium on the measurement of the flow rate can be compensated for. This resistor $R_K$ is also preferably embodied as a film resistor, for instance being formed by vapor deposition onto a substrate.

To avoid major changes in the temperature profile over the three-dimensional extent of the temperature-dependent resistor $R_H$ when the flow rate changes, special provisions must be taken.

As theoretical and experimental studies have shown, up to a certain extent a protective heating of the temperature-dependent resistor $R_H$ is suitable for this purpose, thereby maintaining the immediate vicinity of the resistor $R_H$ at the particular excess temperature determined by the instantaneous flow speed and temperature of the medium being measured.

In the present exemplary embodiment of the apparatus, two protective heating resistors $R_S$ are provided, which are attached to the same substrate as the temperature-dependent resistor $R_H$ and enclose it in the manner of a frame. These resistors $R_S$ for protective heating are preferably realized using the same technique as the resistors $R_H$ and $R_K$ and have the same square resistance. They are acted upon by the output variable of the regulating amplifier 13 and operate passively, as it were, that is, in a controlled manner with a predetermined temperature value that is dependent on the resistance temperature of the resistor $R_H$. So that the temperatures of the resistors $R_S$ will agree with the resistance temperature of the resistor $R_H$, however, a suitable geometry must be selected for the resistors, because their surface area resistance is identical.

A further advantage of this arrangement results from the fact that a major part of the required heating output can be drawn from the bridge branch having the resistors $R_H$, $R_2$, and delivered to the protective heating resistors $R_S$. The loss capacity appearing at the resistor $R_2$ can thus be lessened. A further provision, namely using the output voltage of the regulating amplifier 13 as a measurement variable, also proves to be favorable for the overall capacity of the entire apparatus when there are changes in the air temperature. Furthermore, the measurement variable $U_B$ has a high signal modulation rate which favorably affects the accuracy of the further processing of the measurement data.

Figure 2:
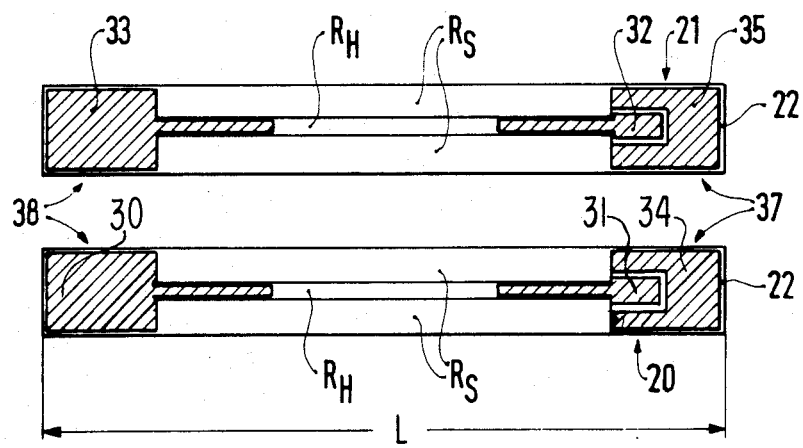
FIG. 2 shows an exemplary embodiment, in order to illustrate the particular arrangement of the conductive films of the device upon a substrate.

FIG. 2 shows one form of embodiment of the apparatus shown in FIG. 1. Reference numeral 20 indicates the bottom and 21 the top of a substrate 22, made for instance of ceramic. The dimensions of the substrate 22 are approximately on the order of a width of 4 mm and a length L of approximately 25 mm. The coating of the top and bottom of the substrate 22 is symmetrical relative to the resistors $R_H$ and $R_S$, and the temperature dependent resistor $R_H$, having a length of about 10 mm and a width of about 0.5 to 2 mm, is disposed in the middle. The resistors $R_S$ are vapor-deposited onto the substrate on both sides of the resistor $R_H$ and have a width of about 1.5 mm and a length, in the present exemplary embodiment, of about 20 mm. However, it should be noted that the ratio of the lengths of the film resistors $R_H$ and $R_S$ depends on the resistance ratio of the bridge resistors $R_H$ to $R_2$. The absolute length is determined by the required integration length of $R_H$, which depends on the flow conditions at the measurement location, among other factors. The present illustration relates to a symmetrical bridge disposition. The shaded surfaces indicate low-impedance conductor tracks; 30, 31, 32, 33 indicate the conductor tracks for the electrical connections relating to the resistor $R_H$. In comparison, the conductor tracks required for the resistors $R_S$ are indicated by reference numerals 34 and 35. The connections 30 and 33 are identical for $R_S$ and $R_H$ and correspond to point D in FIG. 1.

In FIG. 2, each of the resistors $R_H$ and $R_S$ were subdivided into two resistors. This provision allows the resistors $R_H$ and $R_S$ to be disposed on both sides of the substrate 22, which assures a substantially more homogeneous temperature distribution of the resistance temperatures of the resistor $R_H$.

The resistors $R_H$ on the bottom 20 and top 21 are connected in parallel, for example. The resistors $R_S$, which effect protective heating of the resistors $R_H$, are paired to surround each resistor $R_H$ on the bottom 20 and top 21 of the substrate 22. The protective resistors $R_S$ are also connected in parallel, in the present exemplary embodiment. Naturally, they may be connected in series instead, as may the resistors $R_S$.

The conductor tracks 30, 34 on the bottom 20 and 33, 35 on the top 21 are disposed along the length L of the substrate 22, each facing one another in a respective peripheral area 37 or 38 of the substrate. According to the invention, the peripheral areas 37 or 38 of the substrate 22 should be kept at a predetermined temperature; in particular, this temperature should be the temperature of the flowing medium, that is, for example, the temperature of the aspirated air mass when the device is used in the intake tube of internal combustion engines.

FIG. 2a shows the connections between the protective resistors and the temperature dependent resistor and the base point A of the resistance measuring bridge, and points B and D of the measuring bridge. The connections shown in FIGS. 1 and 2 are shown at 30, 31 and 34 for the bottom 20 of the substrate and at 32, 33 and 35 for the top of the substrate.

Figure 3:
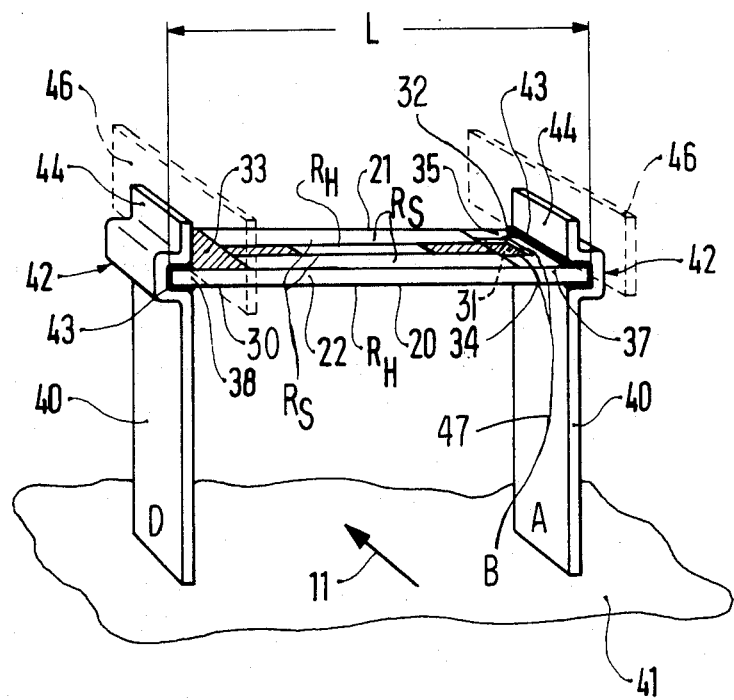
FIG. 3 shows an embodiment of the device having thermal conductor elements.

How the peripheral areas 37 or 38 are kept at the predetermined peripheral temperature will now be explained, referring to the exemplary embodiment shown in FIG. 3, in which elements illustrated that are embodied and that function identically to those of FIGS. 1 and 2 are identified by the same reference numerals. The device according to FIG. 3 has a substrate 22, on the bottom 20 and top 21 of which there is a respective temperature-dependent resistor $R_H$ disposed in the middle portion of the substrate; the resistors $R_H$, which are embodied as films, may for example be electrically connected in parallel. The top 21 and the bottom 20 are embodied identically so that the conductor tracks 30 and 33, 31 and 32, 34 and 35 and the resistors $R_H$ and also the resistors $R_S$ are arranged in plannar, coincident relationship on the top 21 and the bottom 20 of the substrate 22. Connected to the conductor tracks 31, 32 is a wire 47 that leads to the point B, while the right retainer body 40 forms point A and the left retainer body 40 forms the point D. In the exemplary embodiment of FIG. 3 protective resistors $R_S$ framing the resistors $R_H$ are provided. In the peripheral areas 37 and 38 of the substrate 22, the electrical conductor tracks 30 and 34 are disposed on the bottom 20 and the electrical conductor tracks 33 and 35 are disposed on the top 21. The substrate 22 is as much as possible disposed in the flow of the medium such that the surfaces of the substrate 22 that receive the resistors $R_H$ extend parallel to the flow direction 11. The support of the substrate 22 in the flow of the medium is effected by means of at least one retainer body 40, which takes the form of a leaf spring, having one end secured in a housing 41, which for example is the wall of a tube or intake tube 10. As shown in the exemplary embodiment of FIG. 3, two retainer bodies 40 can also be used to support the substrate 22. The retainer bodies 40 are made of metal and should have the best possible thermal and electrical conductivity, so that the electrical contacting of the resistors $R_H$ can be effected via the retainers 40. To this end the retainers 40 protrude into the flow of the medium 11 and have U-shaped deformations 42, which partly encompass the peripheral areas 37 and 38 and to which good electrical contact with the conductor tracks 30, 33, 34, 35 can be furnished by means of soldering indicated as 43.

According to the invention, the peripheral areas 37, 38 are kept to a predetermined temperature, in particular the temperature of the flowing medium. To this end, retainers 40 protruding into the flow of the medium can be used as heat conducting elements, which should have not only good thermal conductivity but also the least possible mass, so that if the temperature of the flowing medium varies, they can rapidly assume this temperature as well. To increase the heat-exchange surface area of the retainers 40, it may be useful to provide the retainers 40, remote from the housing 41, with thermal conduction surfaces 44, adjoining the U-shaped deformations 42. These thermal conduction surfaces 44 can be formed onto the retainers 40 or may be joined to them in a good thermal connection.

In a further embodiment, there are plate-like thermal conduction elements 46, shown in the drawing in dashed lines, disposed in the vicinity of the peripheral areas 37, 38; these elements are made of some material having good thermal conduction and are for instance joined to the thermal conduction surfaces 44 of the retainers 40 or formed integrally into the U-shaped deformations 42, and they assume or reinforce the above-described function of the retainers 40 in terms of the temperature adaptation of the peripheral areas 37, 38. The embodiment shown in FIG. 3 can naturally also be used in an embodiment of the device having protective heating resistors $R_S$ as shown in FIG. 2.

Because in accordance with the invention the peripheral areas 37, 38 of the substrate 22 are kept at a predetermined temperature, in particular that of the flow of the medium, which is predetermined like the resistance temperature at the temperature-dependent resistor $R_H$, a constant temperature profile along the length L of the substrate 22 is obtained even during changes in the mass of the flowing medium; thus not only are shorter startup times attained but also shorter response times to sudden changes in the mass of the flow of the medium, and in particular when the mass of the flowing medium suddenly decreases, which for instance happens in a motor vehicle if the driver releases the gas pedal, the engine of which thereupon returns to its idling position. The shortening of the startup and response times in a device embodied in accordance with the invention is based on the fact that when there are variations in the flow of the medium along the length of the substrate 22, the temperature profile remains largely unchanged, and thus a flow of heat for adapting to the altered cooling output of the medium flowing past is unnecessary. A further advantage is that the peripheral areas 37, 38 of the substrate 22 that are used for electrical contacting are at the temperature of the flowing medium, or as a rule at the temperature of the ambient intake air, so that contacting at these peripheral areas 37, 38 which are kept at a relatively low temperature can be effected by soft soldering.

The foregoing relates to preferred exemplary embodiments of the invention, it being understood that other variants and embodiments thereof are possible within the spirit and scope of the ihvention, the latter being defined by the appended claims.

What is claimed and desired to be secured by Letters Patent of the United States is:

1. A method for measuring the mass of a medium having an ambient temperature and flowing through a housing, in particular for measuring an air mass aspirated by an internal combustion engine, comprising the steps of:

applying a first film to a portion of a surface of a substantially rectangular substrate having a longitudinal extent to form at least one temperature-dependent resistor having sides, disposing along said longitudinal extent of the substrate and on opposite sides of the at least one temperature-dependent resistor respective second films to form protective heating resistors having greater length than said at least one temperature-dependent resistor, orienting said film on said surface so that said at least one temperature-dependent resistor is disposed substantially medially of terminal portions of the substrate, disposing at least one of said terminal portions in a metallic, thermally-conductive support means for thermal contact therewith, further disposing said support means so that the at least one temperature-dependent resistor lays transversely to a flow direction of said medium and said terminal portions are exposed thereto, connecting a resistance detection device having a regulating function to said at least one temperature-dependent resistor to form a closed loop for detecting a resistance value of the at least one temperature-dependent resistor, regulating the at least one temperature-dependent resistor to a predetermined resistance temperature by varying a supply of energy thereto, and maintaining said protective heating resistors at a temperature that approximates said predetermined resistance temperature of the at least one temperature-dependent resistor, whereby the at least one terminal portion of the substrate may be maintained at substantially the temperature of the medium.

2. The method as defined by claim 1, further comprising said metallic, thermally-conducting element possesses good thermal conductivity and low mass.

3. The method as defined by claim 1, further comprising the step of providing at least one retainer body to serve as the metallic, thermally-conducting support means and attaaching same to an inner portion of the housing.

4. An apparatus for measuring mass of a medium flowing in a housing, in particular for measuring air aspirated through an intake tube of an internal combustion engine, comprising, at least one temperature-dependent resistor disposed in said housing transversely to a flow direction of said medium, said at least one temperature-dependent resistor consisting of a first film applied to a portion of a surface of a substrate and having side portions, said substrate further having a longitudinal extent and terminal portions, said terminal portions further being exposed to said slow of medium for continuous transmission of an ambient termperature of said flow thereto, said substrate further being provided with a second film applied thereto on each side of said at least one temperature-dependent resistor, each said second film comprising a protective heating resistor disposed proximately to said at least one temperature-dependent resistor, each said second film having a length greater than a length of said first film, at least one of said terminal portions of said substrate being disposed in a metallic, thermally-conducting support means arranged to retain the substrate in the flow of the medium, said at least one temperature-dependent resistor and said protective heating resistors being connected to a resistance detection device having a regulating function to form a closed loop for detecting a resistance value of the at least one temperature-dependent resistor, said at least one temperature-dependent resistor being regulated to a predetermined resistance temperature by regulating a supply of energy thereto, and said protective heating resistors are heated electrically to substantially said predetermined resistance temperature, whereby a response time and an accuracy of measurement of said temperature-dependent resistor may be improved.

5. An apparatus as defined by claim 4, further comprising said at least one metallic, thermally-conducting element is comprised of a material having good thermal conductivity and low mass.

6. An apparatus as defined by claim 4, further comprising said at least one metallic, thermall-conducting element comprises at least one retainer body attached to a housing through which said medium flows and said retainer body engages said terminal portions of the substrate.

7. An apparatus as defined by claim 6, further comprising the retainer body simultaneously serves as a means of providing electrical connection to said films.

* * * * *